(12) United States Patent
Kwon et al.

(10) Patent No.: US 11,577,740 B2
(45) Date of Patent: Feb. 14, 2023

(54) APPARATUS AND METHOD FOR PREVENTING ABNORMAL ACCELERATION DUE TO MISOPERATION OF ACCELERATOR PEDAL OF VEHICLE

(71) Applicants: Hyundai Motor Company, Seoul (KR); Kia Motors Corporation, Seoul (KR)

(72) Inventors: Oh-Eun Kwon, Gyeonggi-do (KR); Sun-Young Park, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 16/923,596

(22) Filed: Jul. 8, 2020

(65) Prior Publication Data
US 2021/0261144 A1    Aug. 26, 2021

(30) Foreign Application Priority Data
Feb. 25, 2020    (KR) ........................ 10-2020-0022938

(51) Int. Cl.
*B60W 50/038* (2012.01)
*G01C 21/34* (2006.01)
(Continued)

(52) U.S. Cl.
CPC .......... *B60W 50/038* (2013.01); *B60W 30/09* (2013.01); *B60W 30/0956* (2013.01); *G01C 21/3461* (2013.01); *G01C 21/3679* (2013.01); *G01S 19/42* (2013.01); *B60W 2540/10* (2013.01); *B60W 2554/80* (2020.02); *B60W 2555/60* (2020.02)

(58) Field of Classification Search
CPC ......... B60W 2420/52; B60W 2540/10; B60W 2554/80; B60W 2554/802; B60W 2555/60; B60W 2556/50; B60W 2720/106; B60W 30/09; B60W 30/0956; B60W 30/143; B60W 50/038; G01C 21/3461; G01C 21/3679; G01S 17/931; G01S 19/42; G08G 1/165; G08G 1/166
See application file for complete search history.

(56) References Cited

U.S. PATENT DOCUMENTS

| 6,222,462 | B1 * | 4/2001 | Hahn ..................... G08G 1/164 340/904 |
| 10,773,732 | B1 * | 9/2020 | Alexander ........... G05D 1/0212 |

(Continued)

FOREIGN PATENT DOCUMENTS

KR    101187125 B1    9/2012

*Primary Examiner* — Babar Sarwar
(74) *Attorney, Agent, or Firm* — Fox Rothschild LLP

(57) ABSTRACT

A system for preventing abnormal acceleration of a vehicle includes a device configured such that in a state in which the vehicle is stopped while the vehicle is turned on, the device is configured to determine whether abnormal acceleration prevention is necessary based on a final destination or a current position of the vehicle before the vehicle is turned off to thereby limit a vehicle speed. The system and a method for preventing abnormal operation of the vehicle can prevent a vehicle accident due to the abnormal acceleration caused by misoperation by a driver, such as misoperation of an accelerator pedal of the vehicle.

11 Claims, 2 Drawing Sheets

(51) Int. Cl.
   *G01C 21/36*    (2006.01)
   *B60W 30/095*   (2012.01)
   *G01S 19/42*    (2010.01)
   *B60W 30/09*    (2012.01)

(56) References Cited

U.S. PATENT DOCUMENTS

| | | | |
|---|---|---|---|
| 10,955,846 B1* | 3/2021 | Silver | G01C 21/3602 |
| 2014/0025267 A1* | 1/2014 | Tezuka | B60W 30/18027 |
| | | | 701/51 |
| 2016/0252904 A1* | 9/2016 | Sakai | B60W 50/14 |
| | | | 701/26 |
| 2017/0294117 A1* | 10/2017 | Burke | G08G 1/0129 |
| 2018/0208188 A1* | 7/2018 | Williams | B60T 8/17 |
| 2019/0011910 A1* | 1/2019 | Lockwood | G05D 1/0038 |
| 2019/0315347 A1* | 10/2019 | Ike | B60W 30/08 |
| 2020/0159215 A1* | 5/2020 | Ding | G05D 1/0221 |
| 2020/0172092 A1* | 6/2020 | Cha | B60Q 9/008 |
| 2020/0284608 A1* | 9/2020 | Ghannam | G01C 21/3697 |
| 2020/0317216 A1* | 10/2020 | Konrardy | B60W 30/182 |
| 2021/0003682 A1* | 1/2021 | Braley | G06N 3/08 |
| 2021/0031793 A1* | 2/2021 | Stayton | H04W 4/46 |
| 2021/0046924 A1* | 2/2021 | Caldwell | G05D 1/0214 |
| 2021/0086772 A1* | 3/2021 | Matsuura | B60W 50/087 |
| 2021/0141380 A1* | 5/2021 | Parasuram | G06V 40/10 |

\* cited by examiner

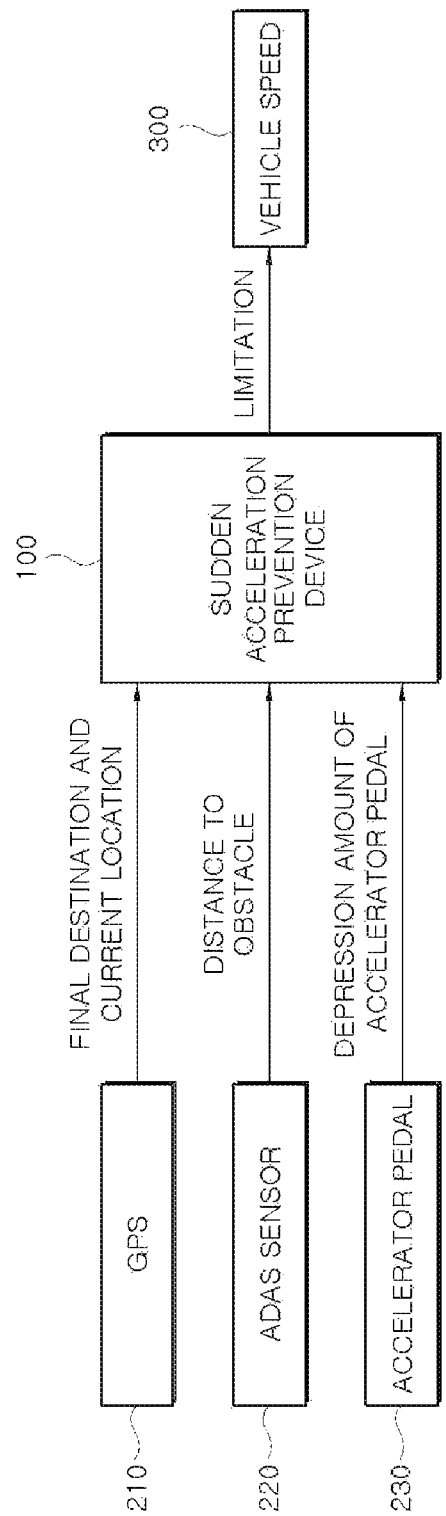

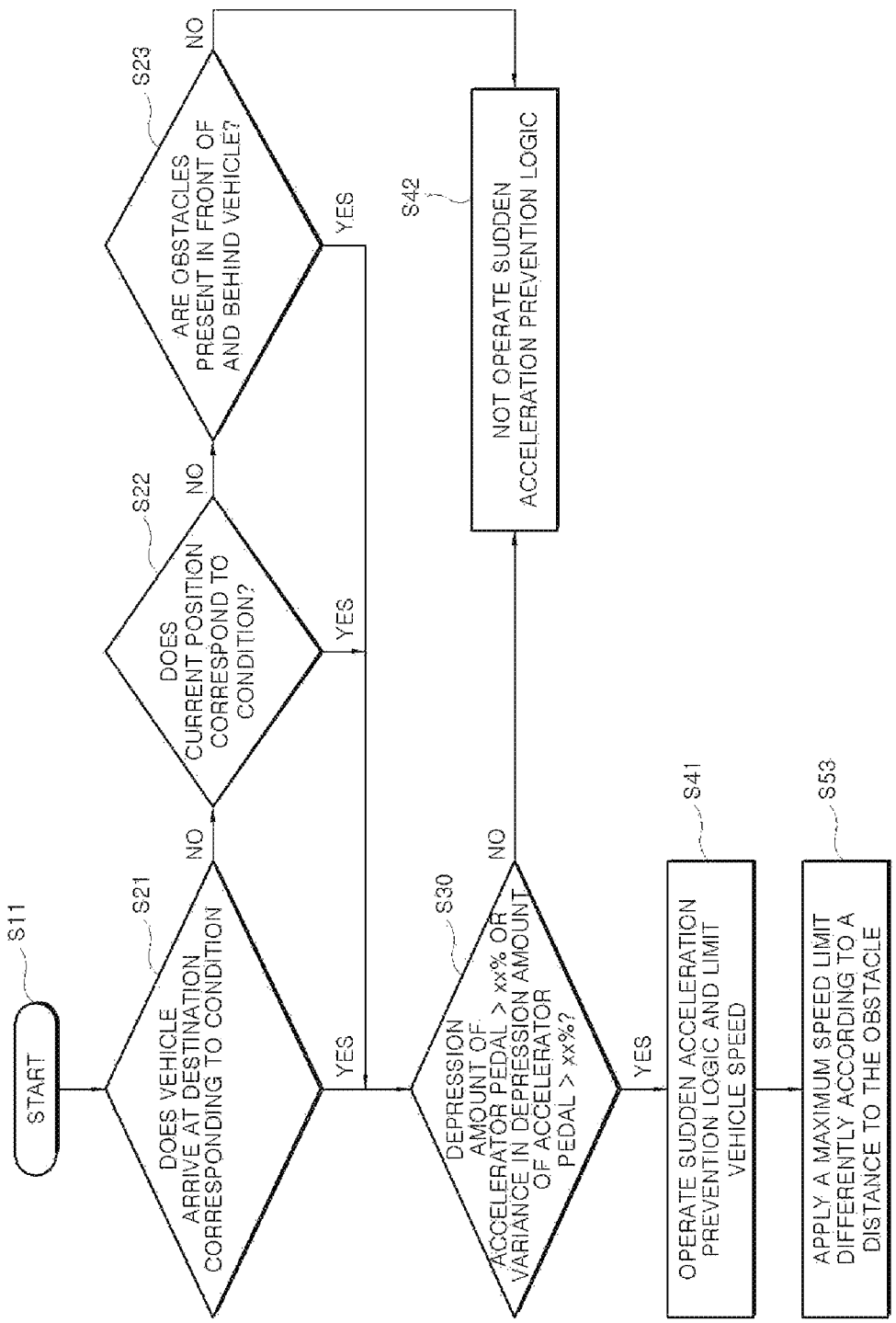

APPARATUS AND METHOD FOR PREVENTING ABNORMAL ACCELERATION DUE TO MISOPERATION OF ACCELERATOR PEDAL OF VEHICLE

CROSS-REFERENCE TO RELATED APPLICATION

This application claims under 35 U.S.C. § 119(a) the benefit of Korean Patent Application No. 10-2020-0022938, filed on Feb. 25, 2020, which is incorporated herein by reference.

BACKGROUND

(a) Technical Field

Exemplary embodiments of the present disclosure relate to a system and method for preventing abnormal acceleration of a vehicle due to misoperation of an accelerator pedal of the vehicle.

(b) Description of the Related Art

As the population ages, an age range of drivers operating passenger vehicles is expanding, and various functions may be included in the vehicles that tend to increase difficulties for elderly drivers, which may result in an increased rate of accidents caused due to misoperation of accelerator pedals and/or other vehicle components or functions.

Although an accident may be the fault of a driver, since an accident due to abnormal acceleration causes a very dangerous situation and may result in significant damage or injury, it is necessary to devise technical measures capable of preventing abnormal acceleration due to misoperation of an accelerator pedal, for example.

The contents described in the above Description of Related Art are to help the understanding of the background of the present disclosure, and may include what is not previously known to a person of ordinary skill in the art to which the present disclosure pertains.

SUMMARY

An embodiment of the present disclosure is directed to an abnormal acceleration prevention system, and an abnormal acceleration prevention method which are capable of preventing an accident due to abnormal acceleration in a vehicle caused by misoperation of an accelerator pedal.

In accordance with an embodiment of the present disclosure, there is provided a system for preventing abnormal acceleration of a vehicle, including a device configured such that in a state in which the vehicle is stopped while the vehicle is turned on, by determining whether abnormal acceleration prevention is necessary based on a final destination or a current position of the vehicle before the vehicle is turned off to thereby limit a vehicle speed.

Here, when the final destination or the current position may be a predetermined place requiring the abnormal acceleration prevention before the vehicle is turned off, the vehicle speed may be limited.

Further, the predetermined place requiring the abnormal acceleration prevention may be a protection zone, a speed limit zone, a parking lot, or a gas station.

Further, a depression amount of an accelerator pedal by a driver's operation may be compared with a reference depression amount of the accelerator pedal, and whether the abnormal acceleration prevention is necessary may be determined so that the vehicle speed may be limited.

Here, the determination of whether the abnormal acceleration prevention is necessary may be performed according to whether the depression amount of the accelerator pedal exceeds the reference depression amount of the accelerator pedal within a predetermined time.

Further, the reference depression amount of the accelerator pedal may be adjusted based on learning information of an operation amount of the accelerator pedal.

Meanwhile, after the limiting of the vehicle speed, whether a speed limit release condition is satisfied may be monitored, and, when the speed limit release condition is satisfied, the limiting of the vehicle speed may be released.

In accordance with another embodiment of the present disclosure, there is provided a system configured to prevent abnormal acceleration due to misoperation, in a state in which a vehicle is stopped while the vehicle is turned on, by determining whether abnormal acceleration prevention is necessary according to whether obstacles in front of or behind the vehicle are present to thereby limit a vehicle speed.

Further, when an obstacle is present in front of or behind the vehicle, the vehicle speed may be limited, and a maximum speed limit may be differently applied according to a distance to the obstacle.

Here, when the obstacle is present in front of the vehicle and a shift stage is a drive (D) stage, the vehicle speed may be limited, and, when the obstacle is present behind the vehicle and the shift stage is a rear (R) stage, the vehicle speed may be limited.

Further, the depression amount of the accelerator pedal by the driver's operation may be compared with a reference depression amount of the accelerator pedal, and whether the abnormal acceleration prevention is necessary may be determined so that the vehicle speed may be limited.

Here, the determination of whether the abnormal acceleration prevention is necessary may be performed according to whether the depression amount of the accelerator pedal exceeds the reference depression amount of the accelerator pedal within a predetermined time.

Meanwhile, the reference depression amount of the accelerator pedal may be adjusted based on learning information on an operation amount of the accelerator pedal.

Further, after the limiting of the vehicle speed, whether a speed limit release condition is satisfied may be monitored, and, when the speed limit release condition is satisfied, the limiting of the vehicle speed may be released.

In accordance with still another embodiment of the present disclosure, there is provided a method of preventing abnormal acceleration due to misoperation, the method including determining whether a final destination at which a vehicle arrives before the vehicle is turned off is a predetermined place requiring abnormal acceleration prevention; determining whether a current location of the vehicle is the predetermined place requiring the abnormal acceleration prevention; determining whether obstacles are present in front of or behind the vehicle; in a state in which the vehicle is stopped while the vehicle is turned on, when the final destination at which the vehicle arrives before the vehicle is turned off is the predetermined place requiring the abnormal acceleration prevention, the current location of the vehicle is the predetermined place requiring the abnormal acceleration prevention, or the obstacles are present in front of or behind the vehicle, comparing a depression amount of an accelerator pedal by a driver's operation with a reference depression amount of the accelerator pedal; and when the depression amount of an accelerator pedal exceeds the reference depression amount of the accelerator pedal, limiting a vehicle speed.

Here, the determination of whether the depression amount of the accelerator pedal exceeds the reference depression amount of the accelerator pedal may be performed according to whether the depression amount of the accelerator pedal exceeds the reference depression amount of the accelerator pedal within a predetermined time.

Further, the reference depression amount of the accelerator pedal may be adjusted based on learning information on an operation amount of the accelerator pedal.

Further, the method may further include, after the limiting of the vehicle speed, monitoring whether a speed limit release condition is satisfied, and, when the speed limit release condition is satisfied, releasing the limiting of the vehicle speed.

Further, the limiting of the vehicle speed may include differently applying a maximum speed limit according to a distance to the obstacle, which is determined in the determining of whether the obstacles are present in front of or behind the vehicle.

Meanwhile, the predetermined place requiring the abnormal acceleration prevention may be a children protection zone, a parking lot, or a gas station.

BRIEF DESCRIPTION OF THE DRAWINGS

FIG. 1 is a block diagram illustrating an abnormal acceleration prevention system of the present disclosure.

FIG. 2 is a flowchart illustrating an abnormal acceleration prevention method of the present disclosure.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference should be made to the accompanying drawings that illustrate preferred embodiments of the present disclosure, and to the description in the accompanying drawings in order to fully understand the present disclosure and operational advantages of the present disclosure, and objects attained by practicing the present disclosure.

FIG. 1 is a block diagram illustrating an abnormal acceleration prevention system of the present disclosure, and FIG. 2 is a flowchart illustrating an abnormal acceleration prevention method of the present disclosure.

Hereinafter, an abnormal acceleration prevention system, and an abnormal acceleration prevention method according to one embodiment of the present disclosure will be described with reference to FIGS. 1 and 2.

The present disclosure relates to a system and a method for controlling to prevent occurrence of an abnormal acceleration situation, in particular, to limit vehicle speed when a driver misoperates an accelerator pedal, e.g., when the driver mistakenly depresses the accelerator pedal.

Limiting of the vehicle speed can function to temporarily limit a maximum speed of a vehicle based on a current position of the vehicle and surrounding obstacle information to prevent abnormal acceleration and abrupt steering due to the misoperation.

To this end, the abnormal acceleration prevention system of the present disclosure includes an abnormal acceleration prevention device 100 configured to determine an abnormal acceleration situation to limit a maximum speed, a global positioning system (GPS) receiver 210, an advanced driver assistance system (ADAS) sensor 220, an accelerator pedal sensor 230, and a vehicle speed control device 300. For example, the abnormal acceleration preventing device 100 (i.e., "device") may be a controller, which can include a processor and memory for carrying out its functions.

The GPS receiver 210 determines a current position of the vehicle and transmits the determined current position to the abnormal acceleration prevention device 100.

The ADAS sensor 220 may include a light detection and ranging (LiDAR) sensor, a radio detecting and ranging (RADAR) sensor, a camera, or the like. The ADAS sensor 220 scans distances to obstacles in front of or behind the vehicle and transmits the scanned distances to the abnormal acceleration prevention device 100.

When an accelerator pedal is operated, information on a depression amount of the accelerator pedal is transmitted to the abnormal acceleration prevention device 100 through the accelerator pedal sensor 230, thereby determining whether abnormal acceleration prevention control is necessary.

The abnormal acceleration prevention device 100 sets a final destination (e.g., a children protection zone, a senior protection zone, a speed limit zone, a supermarket, a parking lot, a gas station, or the like) based on the information from the GPS receiver 210 before the vehicle is turned off, and then, the abnormal acceleration prevention device 100 determines whether the vehicle has arrived at the final destination to set an initial speed limit while the vehicle is turned on.

Then, the abnormal acceleration prevention device 100 differentially sets speed limits based on the distances, which are scanned by the ADAS sensor 220, to obstacles in front of or behind the vehicle. For example, when the distance to the obstacle is within 10 m, the abnormal acceleration prevention device 100 set the speed limit to 30 kph, and, when the distance to the obstacle ranges from 10 m to 20 m, the abnormal acceleration prevention device 100 set the speed limit to 50 kph.

Further, the abnormal acceleration prevention device 100 determines whether to operate an abnormal acceleration prevention logic based on the information on the depression amount of the accelerator pedal, which is received from the accelerator pedal sensor 230, and monitors the number of times of the operation to release the abnormal acceleration prevention logic.

The abnormal acceleration prevention device 100 limits or releases an operation of the vehicle speed control device 300 according to a maximum speed limit which is differentially limited from the above conditions. The vehicle speed control device 300 may be a power generation device such as an engine or the like.

Further, together with the ADAS sensor 220, when a current shift stage is a drive (D) stage based on shift stage information, the abnormal acceleration prevention device 100 determines whether the obstacle in front of the vehicle is present, and, when the current shift stage is a rear (R) stage, the abnormal acceleration prevention device 100 controls by determining whether the obstacle behind the vehicle is present.

The abnormal acceleration prevention device 100 may be an electronic control unit (ECU) for controlling overall functions of the vehicle or may be a separate control device from the ECU.

As described above, when it is determined as an abnormal acceleration situation due to misoperation, the abnormal acceleration prevention device 100 differentially applies the maximum speed limit according to the current position, a relationship with the obstacles, the depression amount of the accelerator pedal, and the like, and the vehicle speed control device 300 generates power in response to a maximum speed limit signal from the abnormal acceleration prevention device 100.

FIG. 2 illustrates an abnormal acceleration prevention method using the abnormal acceleration prevention device 100. The abnormal acceleration prevention method of the present disclosure will be described with reference to FIG. 2.

The abnormal acceleration prevention device 100 sets a predetermined initial speed limit in a state in which the abnormal acceleration prevention method is started (S11). Further, in the above state in operation S11, the abnormal acceleration prevention device 100 determines whether the vehicle arrives at a final destination corresponding to a condition based on vehicle GPS information from the GPS receiver 210 (S21).

As the determination result in operation S21, when the vehicle does not arrive at the final destination corresponding to the condition, the abnormal acceleration prevention device 100 determines whether a current position of the vehicle corresponds to the above condition (S22).

In operations S21 and S22, the final destination corresponding to the above condition means a destination, in which a serious accident may occur during abnormal acceleration, such as a children protection zone, a supermarket, a parking lot, a gas station, and the like. In this case, operations S21 and S22 are performed to prevent abnormal acceleration.

Further, even when the determination results in operations S21 or S22 do not satisfy the above condition, the abnormal acceleration prevention device 100 determines whether obstacles are present in front of or behind the vehicle through the ADAS sensor 220 (S23). When the obstacles are determined as not being present, the abnormal acceleration prevention device 100 controls the abnormal acceleration prevention logic to not be operated (S42).

Here, a vehicle speed is limited by the differential maximum speed limit in operation S41 which will be described below and a maximum speed limit is differentially applied according to a distance to the obstacle (S43).

Further, the order of operations S21, S22, and S23 may be interchangeable.

Next, as the determination result in operation S23, when the obstacle is present in front of or behind the vehicle and a shift stage is positioned in a direction in which the obstacle in front of the vehicle is present, the abnormal acceleration prevention device 100 determines a depression amount of the accelerator pedal or a variance in depression amount of the accelerator pedal based on the information from the accelerator pedal sensor 230 (S30).

As a result, when the depression amount of the accelerator pedal or the variance in depression amount of the accelerator pedal exceeds a predetermined reference depression amount xx % or a predetermined reference variance in depression amount xx %, the abnormal acceleration prevention device 100 controls the vehicle speed control device 300 to operate the abnormal acceleration prevention logic, thereby limiting the vehicle speed (S41). Further, a comparison with the predetermined reference depression amount xx % may be determined according to whether the depression amount of the accelerator pedal exceeds the predetermined reference depression amount xx % within a predetermined time. For example, the comparison result may include that the depression amount of the accelerator pedal exceeds 70% of the predetermined reference depression amount xx % within 2 seconds, and the like.

However, when the depression amount of the accelerator pedal is less than the predetermined reference depression amount xx %, the abnormal acceleration prevention device 100 controls the vehicle speed control device 300 to not operate the abnormal acceleration prevention logic (S42).

Further, immediately when the limiting of the vehicle speed is performed in operation S41, the abnormal acceleration prevention device 100 controls a cluster to allow a driver to immediately recognize the performance of the limiting of the vehicle speed through an alarm or an indicator lamp on the cluster.

Further, it is preferable that the above control according to the present disclosure is selectable by the user through an ON/OFF setting.

Further, the predetermined reference depression amount xx % for determining the depression amount of the accelerator pedal should be set in advance. However, since tendencies of drivers may be different from each other, after the predetermined reference depression amount xx % is set to an initial setting value, the abnormal acceleration prevention device 100 learns a pattern of a normal depression amount of the accelerator pedal due to an operation of the accelerator pedal, and, when the depression amount of the accelerator pedal is increased, the abnormal acceleration prevention device 100 may adjust the predetermined reference depression amount xx % to a level that is larger than that of the initial setting value. Alternatively, the above description may be applied to a contrary case. This may be fixedly learned based on the vehicle, and learning may be differently performed for each driver through a communication part and an input part.

Further, since the limiting of the vehicle speed should not be continued, the limiting of the vehicle speed is then released under a predetermined condition. That is, after the limiting of the vehicle speed, the vehicle speed is monitored whether a predetermined speed limit release condition is satisfied, and, when the speed limit release condition is satisfied, the limiting of the vehicle speed is controlled to be released.

The speed limit release condition may include the number of operation times of the accelerator pedal, whether a brake is operated, a change from a shift stage to another shift stage before the limiting of the vehicle speed, or a variation in distance to the obstacles in front of or behind the vehicle. When the speed limit release condition is satisfied, the abnormal acceleration prevention logic in operation S41 is controlled to be interrupted.

For example, the speed limit release condition may include a case in which the number of operation times of the accelerator pedal is three or more times.

Conventionally, when a driver mal-operates an accelerator pedal, there was no measures to prevent abnormal acceleration. There are some measures to limit a torque, but there is a limitation that abnormal acceleration is not prevented more reliably.

In accordance with the present disclosure, a current position of a vehicle and distances from the vehicle to obstacles in front of or behind the vehicle are determined using a global positioning system (GPS) (i.e., navigation), information of an advanced driver assistance system (ADAS) sensor, and the like so that an injury caused due to misoperation of a driver can be avoided, and reliability of a customer can be improved by applying the above techniques.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A system for preventing abnormal acceleration of a vehicle, comprising: a device configured such that in a state in which the vehicle is stopped, the device is configured to determine whether abnormal acceleration prevention is necessary based on a final destination before the vehicle is turned off to thereby limit an initial vehicle speed while the vehicle is turned on, and the device is configured to determine whether the abnormal acceleration prevention is necessary according to whether an obstacle in front of or behind the vehicle is present to thereby limit an initial vehicle speed while the vehicle is turned on, wherein, when the obstacle is present in front of or behind the vehicle, the initial vehicle speed is limited, and a maximum speed limit is differently applied according to a distance to the obstacle;

wherein, when the final destination or the current position is a predetermined place requiring the abnormal acceleration prevention, the initial vehicle speed is limited;

and wherein a depression amount of an accelerator pedal by a driver's operation is compared with a reference depression amount of the accelerator pedal, and whether the abnormal acceleration prevention is necessary is determined so that the initial vehicle speed is limited.

2. The system of claim 1, wherein the predetermined place requiring the abnormal acceleration prevention includes a protection zone, a speed limit zone, a parking lot, or a gas station.

3. The system of claim 1, wherein the determination of whether the abnormal acceleration prevention is necessary is performed according to whether the depression amount of the accelerator pedal exceeds the reference depression amount of the accelerator pedal within a predetermined time.

4. The system of claim 1, wherein the reference depression amount of the accelerator pedal is adjusted on the basis of learning information on an operation amount of the accelerator pedal.

5. The system of claim 1, wherein after limiting the initial vehicle speed, whether a speed limit release condition is satisfied is monitored, and when the speed limit release condition is satisfied, the limiting of the initial vehicle speed is released.

6. The system of claim 1, wherein when the obstacle is present in front of the vehicle and a shift stage is a drive (D) stage, the initial vehicle speed is limited, and when the obstacle is present behind the vehicle and the shift stage is a rear (R) stage, the initial vehicle speed is limited.

7. A method of preventing abnormal acceleration of a vehicle, comprising:
    determining whether a final destination at which the vehicle arrives is a predetermined place requiring abnormal acceleration prevention;
    determining whether a current location of the vehicle is the predetermined place requiring the abnormal acceleration prevention;
    determining whether an obstacles is present in front of or behind the vehicle; in a state in which the vehicle is stopped while the vehicle is turned on, when the final destination at which the vehicle arrives before the vehicle is turned off is the predetermined place requiring the abnormal acceleration prevention, the current location of the vehicle is the predetermined place requiring the abnormal acceleration prevention, or the obstacles is present in front of or behind the vehicle, comparing a depression amount of an accelerator pedal by a driver's operation with a reference depression amount of the accelerator pedal;
    and when the depression amount of the accelerator pedal exceeds the reference depression amount of the accelerator pedal, limiting an initial vehicle speed while the vehicle is turned on, wherein the limiting of the initial vehicle speed includes differently applying a maximum speed limit according to a distance to the obstacle, which is determined in the determination of whether the obstacles is present in front of or behind the vehicle.

8. The method of claim 7, wherein the determination of whether the depression amount of the accelerator pedal exceeds the reference depression amount of the accelerator pedal is performed according to whether the depression amount of the accelerator pedal exceeds the reference depression amount of the accelerator pedal within a predetermined time.

9. The method of claim 7, wherein the reference depression amount of the accelerator pedal is adjusted on the basis of learning information on an operation amount of the accelerator pedal.

10. The method of claim 7, further comprising:
after limiting the initial vehicle speed, monitoring whether a speed limit release condition is satisfied; and
when the speed limit release condition is satisfied, releasing the limiting of the initial vehicle speed.

11. The method of claim 7, wherein the predetermined place requiring the abnormal acceleration prevention includes a protection zone, a speed limit zone, a parking lot, or a gas station.

\* \* \* \* \*